UNITED STATES PATENT OFFICE.

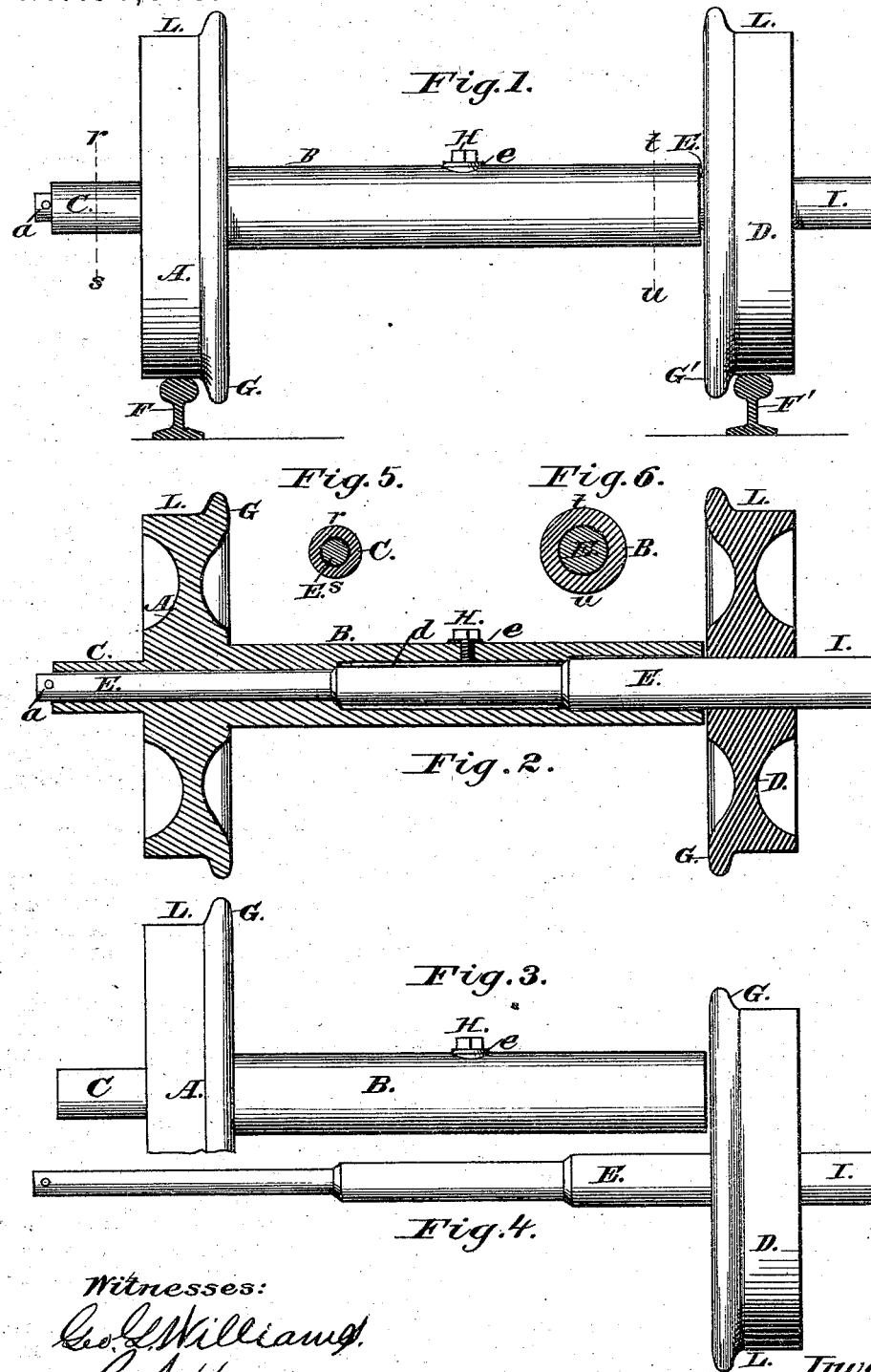

JOHN M. MAY, OF JANESVILLE, WISCONSIN.

IMPROVEMENT IN CAR-AXLES.

Specification forming part of Letters Patent No. 154,503, dated August 25, 1874; application filed August 5, 1871.

*To all whom it may concern:*

Be it known that I, JOHN M. MAY, of Janesville, Rock county, in the State of Wisconsin, have invented certain Improvements in Railroad-Car Wheels and Axles connected therewith, of which the following is a specification:

My invention relates to the construction of railroad and other car wheels; and it consists in the combination of one wheel provided with the axle, and the other wheel provided with a sleeve and a hollow journal, the axle being inclosed within the sleeve, leaving an oil-recess between them, and the axle extending through the wheel and hollow journal formed therewith, all as hereinafter more fully set forth.

By the present mode of attaching two car-wheels firmly and rigidly to the same solid axle, both wheels are caused to revolve with the same velocity over whatever irregular surfaces of road, or however sharp the curves in the alignment of the road may be. On curves the wheel on the outside rail, having the greatest distance to travel, is forced to slip or slide on the rail. The same difficulty arises when one wheel is worn unevenly, or is of less diameter than the other. Also, great lateral pressure and friction on the side or edge of the rail causes great torsion or wringing of the axle, and disintegration of the fibers of the iron. Breaking of wheels and axles, and the consequent loss of life and property, often follow. It also causes great wear and destruction of rails and rolling-stock, and, moreover, requires a great amount of power, in excess of what is needed by my invention, in moving a train of cars. To overcome these and other difficulties, wholly or in part, is sought by allowing each wheel in the truck to revolve independently of the other, and yet retain the strength of the rigid axle and wheel as now constructed.

Figure 1 is an elevation, showing the wheels on rails. Fig. 2 is a vertical longitudinal section cut through the center, the lower part of one wheel being broken away. Figs. 3 and 4 show the parts composing the compound axle and the wheels, the lower part of one wheel being broken away. Figs. 5 and 6 are transverse sections, showing the two parts forming the axle, or the two axles, at different points, as at $t$ and $u$, and $r$ and $s$, in Fig. 1, at right angles with that figure.

The same letter in each figure represents the same part in each figure.

A represents a car-wheel, with its tubular or hollow axle B, with its hollow bearing C, the wheel and axle being of one piece of material, or firmly connected, while D represents a car-wheel with spindle or axle E connected firmly. This axle has a journal, I, and extends through the entire length of tubular axle B, the wheel A, and journal C, the face L of the wheels resting on rails F and F', the flanges G guiding the wheels between the rails, the small end of axle E having a linch-pin at $a$, or may be secured in any proper manner to prevent separating from axle B longitudinally when off the track. Thus the wheels A and D, while kept in their relative position by the compound axle B and E, are allowed to revolve freely and independently of each other.

Two or more sets of wheels may be used in making a truck.

In Fig. 2, the interior of the tubular axle B and the spindle or axle E are more particularly seen as fitted together, so as to allow the wheels to revolve independently of each other, as already described.

The recess $d$ for oil is reached through the hole to which set-screw H is fitted, and is kept tight by means of the packing $e$, of leather or other suitable material. The oil is fed to the bearings in each direction longitudinally as the axles are revolved; but little oil is needed, as the wheels and axles travel so nearly in unison, and the movement of one faster than the other so slight.

In Figs. 3 and 4 are views of wheel A and axle B, rigidly attached, and wheel D and axle E, also rigidly connected together, or made of one piece of material.

In Figs. 5 and 6 are shown cross-sections of Fig. 1, as at $r$ and $s$, near the small end of axle E and its fitting journal C, while at $t$ and $u$, Fig. 6, the axle B and the larger and stronger part of axle E is shown.

The precise form and shape to get the greatest strength of wheel and axle is not designed to be indicated; nor do I confine myself to any particular kind of material to be used in their construction, only that suitable proportions be adopted, and that suitable material be used; neither do I confine myself in the use of my invention to railroads, but may also be used on street or horse cars, tramways, and for similar purposes.

I am aware that a car-axle having a sleeve attached to one wheel, and a solid spindle attached to the other wheel, the sleeve surrounding the spindle, is not new; hence I disclaim such as being broadly my invention.

Having thus fully described my invention, what I claim as new, and desire to secure by Letters Patent, is—

The combination of the wheel D, provided with the axle E, and the wheel A, provided with the sleeve B and hollow journal C, the axle E of the wheel D inclosed within the sleeve B, with oil-recess $d$ between, and extending through the wheel A and hollow journal C, all combined substantially as and for the purposes herein set forth.

JOHN M. MAY.

Witnesses:
  S. A. HUDSON,
  GEO. G. WILLIAMS.